(12) United States Patent
Patel

(10) Patent No.: US 7,070,099 B2
(45) Date of Patent: Jul. 4, 2006

(54) MODULAR ARCHITECTURE FOR A DATA CAPTURE DEVICE

(75) Inventor: Mehul Patel, Fort Salonga, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/955,626

(22) Filed: Sep. 30, 2004

(65) Prior Publication Data

US 2006/0065727 A1  Mar. 30, 2006

(51) Int. Cl.
*G06K 7/00* (2006.01)
*G06K 7/10* (2006.01)

(52) U.S. Cl. .............. 235/439; 235/462.01; 235/462.15

(58) Field of Classification Search .......... 235/462.01, 235/462.15, 462.45, 472.01, 439
See application file for complete search history.

(56) References Cited

U.S. PATENT DOCUMENTS

| | | | | |
|---|---|---|---|---|
| 6,161,760 A | * | 12/2000 | Marrs et al. | 235/462.15 |
| 6,877,663 B1 | * | 4/2005 | Kelly et al. | 235/462.15 |
| 2003/0121981 A1 | * | 7/2003 | Slutsky et al. | 235/462.45 |

* cited by examiner

*Primary Examiner*—Thien M. Le
*Assistant Examiner*—April Taylor
(74) *Attorney, Agent, or Firm*—Fay Kaplun & Marcin, LLP

(57) ABSTRACT

Described is a system having a host computing device, a data capture device collecting data signals and an intermediate signal processing device which receives the data signals from the data capture device. The intermediate signal processing device then processes the data signals and forwards the processed data signals to the host computing device. The intermediate signal processing device being configurable based on a type of the data capture device.

15 Claims, 3 Drawing Sheets

MODULAR ARCHITECTURE FOR A DATA CAPTURE DEVICE

BACKGROUND OF THE INVENTION

Mobile computing devices may include a variety of components to allow the mobile computing device to perform a variety of tasks. A data capture device may be one of the components included in a mobile device to perform data capture tasks. Examples of data capture devices include lasers, imagers, RFID readers, bar code readers, etc. However, in order to integrate any one of these device into a mobile computing device requires a substantial engineering effort which costs both time and money. The integration requires both hardware integration and software integration.

SUMMARY OF THE INVENTION

A systemhaving a host computing device, a data capture device collecting data signals and an intermediate signal processing device which receives the data signals from the data capture device. The intermediate signal processing device then processes the data signals and forwards the processed data signals to the host computing device. The intermediate signal processing device being configurable based on a type of the data capture device.

In addition, a method of recording a type of a data capture device in an intermediate signal processing device, wherein an output of the data capture device is coupled to an input of the intermediate signal processing device. Polling the intermediate signal processing device to determine the type of the data capture device and configuring the intermediate signal processing device based on the type of data capture device, wherein an output of the intermediate signal processing device is coupled to an input of a host computing device.

Furthermore, a system including a configurable intermediate signal processing device capable of accepting input signals from a plurality of data capture devices, processing the input signals and outputting the processed input signals to a plurality of host computing devices, wherein the configurable intermediate signal processing device is electrically coupled to one of the plurality of data capture devices and one of the plurality of host computing devices. The system also including a configuration element to configure the intermediate signal processing device based on the one of the plurality of data capture devices to which the intermediate signal processing device is coupled.

DETAILED DESCRIPTION

Figure 1:
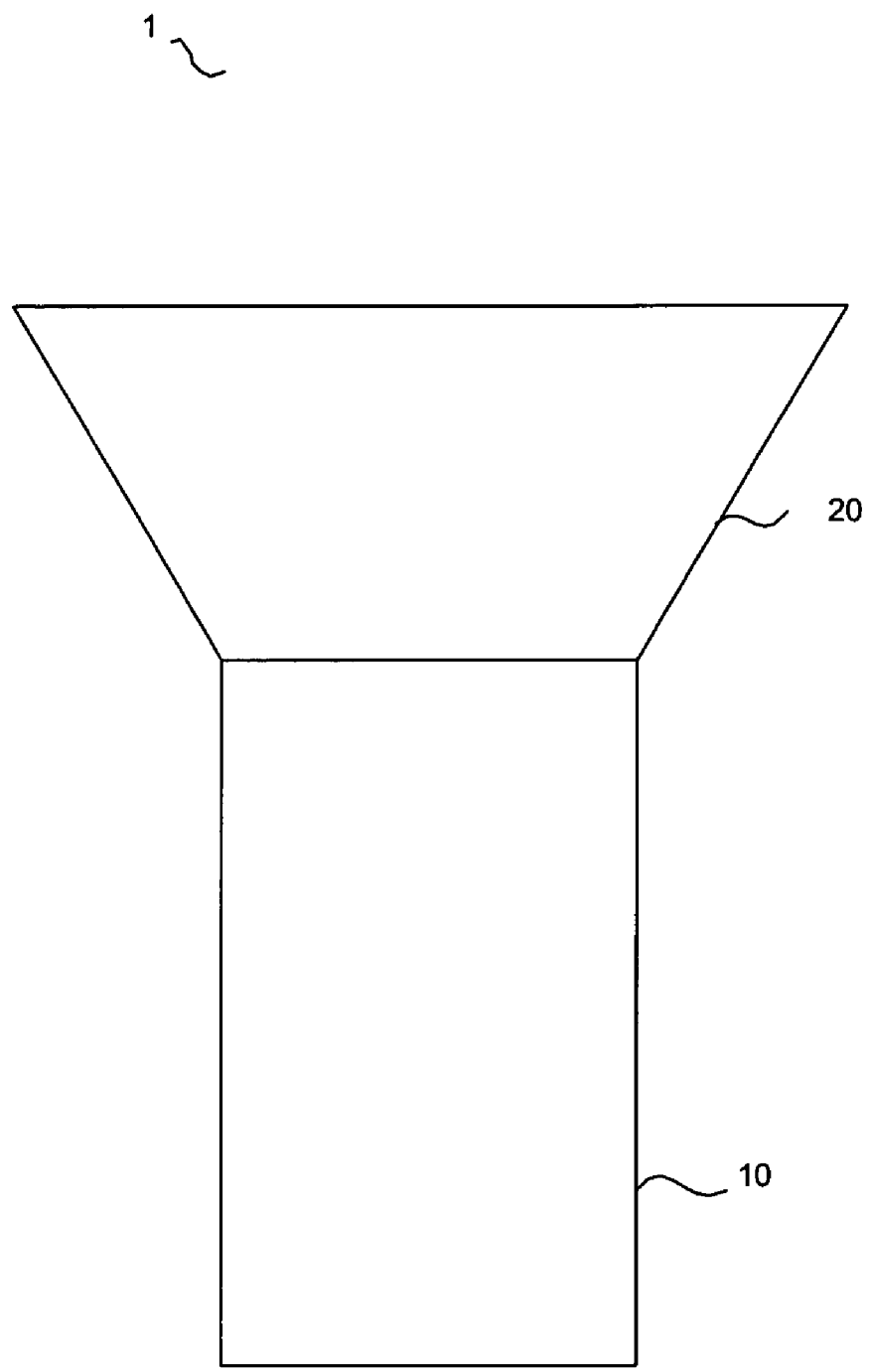
FIG. 1 shows a schematic diagram of an exemplary mobile computing device which includes a host computing device and a data capture device.

The present invention may be further understood with reference to the following description and the appended drawings, wherein like elements are provided with the same reference numerals. FIG. 1 shows a schematic diagram of an exemplary mobile computing device 1 which includes a host computing device 10 and a data capture device 20. The host computing device 10 may be any type of mobile computing platform (e.g., handheld computer, personal digital assistant ("PDA"), proprietary computing device, etc.). Non-limiting examples of processors which may be included in the host computing devices 10 include the XSCALE processor manufactured and sold by the Intel Corporation and the MX-1 processor manufactured and sold by the Motorola, Inc.

Similarly, the data capture device may be any type of device which can read data from a source external to the device (e.g., laser reader, bar code scanner, camera or other type of imager, radio frequency identification ("RFID") device, etc.). Those of skill in the art will understand that the representation of the mobile computing device 1 in FIG. 1 is only schematic and that the actual configuration of a mobile computing device 1 may take on a variety of configurations based on the type of host computing device, data capture device and other components which may be included with the mobile computing device 1.

During normal operation of the mobile computing device 1, a user will point or direct the data capture device 20 at a particular image and/or data holding device from which the user desires to capture data (e.g., a bar code, and RFID tag, etc.). Those of skill will understand that certain data capture devices must be directed toward the image and or data holding device (e.g., bar code, image, picture) from which data is to be collected, i.e., a line of sight between the data capture device and the image is required. Whereas, other types of data capture devices do not require a line of sight, e.g., an RFID reader only needs to be within a pre-defined distance to collect data from and RFID tag. The data capture device 20 collects the data and forwards the data to the host computing device 10 for further processing of the data.

However, a significant amount of engineering effort is expended in order to integrate any particular data capture device 20 with a host computing device 10. Furthermore, in order to provide flexibility, it may be advantageous to allow a variety of data capture devices 20 to be integrated with a particular host computing device 10. In addition, since processing power and other features of host computing devices 10 may change rapidly, it would also be advantageous to allow for upgrades of the mobile computing devices 1 by selecting new host computing devices 10 and quickly integrating data capture devices 20 with these new host computing devices 10.

In order to allow this type of plug and play operation for the data capture device, an exemplary embodiment of the present invention includes an application specific integrated circuit ("ASIC") in the data capture device 20 which allows it to be directly connected to a video port of a microprocessor in the host computing device 10. While the exemplary embodiment is described with reference to an ASIC, those of skill in the art will understand that it may be possible to implement the functionality described for the ASIC using other components, e.g., a general purpose integrated circuit, an embedded controller, a field programmable gate array ("FPGA"), etc.

Figure 2:
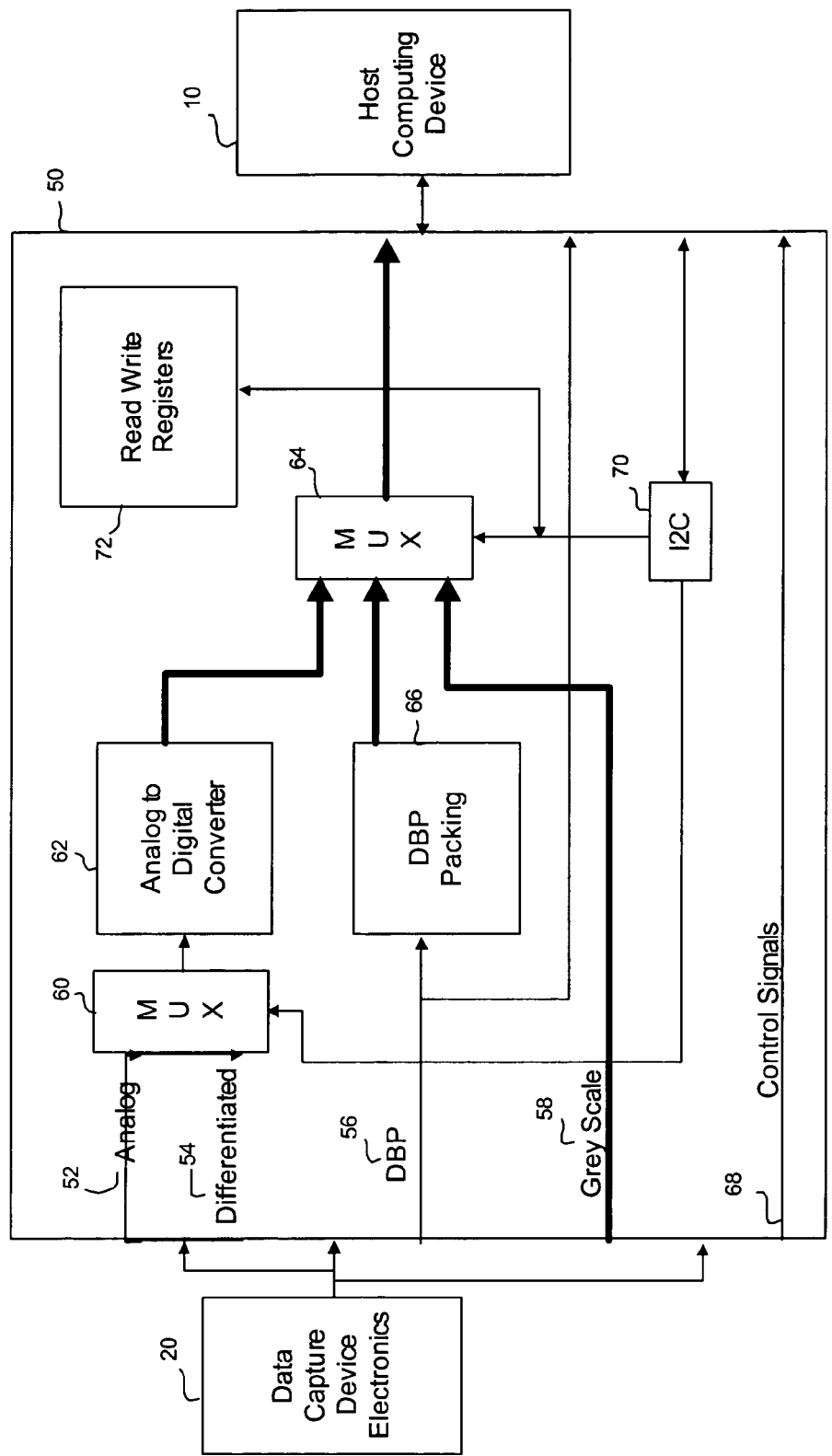
FIG. 2 shows a block diagram of an exemplary ASIC for connecting the data capture device and the host computing device according to the present invention.

FIG. 2 shows a block diagram of an exemplary ASIC 50 for connecting the data capture device 20 and the host computing device 10. As shown in FIG. 2, the ASIC 50 is configured to receive any of a variety of inputs from the electronics of the data capture device 20. In this example, the ASIC 50 is configured to accept data in the form of an analog signal 52, a differentiated analog signal 54, a digital bar pattern ("DBP") 56 and/or an 8–10 bit grey scale pixel signal 58. Thus, the ASIC 50 may be implemented in a variety of data capture devices 20. Those of skill in the art will understand that the ASIC 50 may be further configured to accept additional types of input based on available signals which are output from data capture devices 20. A single common ASIC 50 architecture which accommodates a wide variety of inputs may be used with a wide variety of data capture devices 20, thereby facilitating the plug and play capability of the data capture devices 20 using the same ASIC 50.

The following will describe an exemplary signal processing path for each of the incoming signals from the data capture device 20 electronics through the ASIC 50 to result in a signal which is suitable for outputting to the host computing device 10. The first signal to be addressed is the analog signal 52. The analog signal 52 is received by the ASIC 50 and is input into a multiplexer 60 to combine the complete analog signal 52. The multiplexed analog signal 52 is then sent to an analog-to-digital ("A/D") converter 60 where the analog signal is converted into a digital signal. In the exemplary embodiment, the A/D converter 60 is an 8-bit converter. The digital signal is then sent to the multiplexer 64 where the digital signal is multiplexed into a 10-bit parallel digital data signal. An exemplary multiplexer 64 performs time division multiplexing on the input digital signal to result in the 10-bit parallel digital data signal. The 10-bit parallel digital data signal is then output from the ASIC 50 to a video port of the host computing device 10.

In this exemplary embodiment, the 10-bit digital data signal was selected because it is a standard signal that is generally accepted by video ports of host computing devices 10, e.g., the video ports of the XSCALE and MX-1 processors described above. However, those of skill in the art will understand that it may be possible to convert the incoming signal to a different type of signal that is compatible with the video ports of the host computing devices 10 as required. In a preferred embodiment, the output of the ASIC 50 will be compatible with as many host computing devices 10 as possible to facilitate the plug and play capability of the data capture device 20 with the maximum number of host computing devices 10.

The differentiated analog signal 54 is processed by the ASIC 50 in the same manner as the analog signal 52. Specifically, the differentiated analog signal 54 is multiplexed by the multiplexer 60, converted to a digital signal by A/D converter 62 and then multiplexed into a 10-bit digital data signal by the multiplexer 64. The signal is then sent to the video port of the host computing device 10 for further processing by that device.

The DBP signal 56 is input to the ASIC 50 by the electronics of the data capture device 20 and is routed through the DBP packing component 66. The signal is then forwarded to the multiplexer 64 which converts the signal into the same 10-bit digital data signal as described above. The signal is then forwarded to the video port of the host computing device 10 for further processing by that device.

As shown in FIG. 2, the original DBP signal 56 may bypass all processing in the ASIC 50 and be fed directly into the video port of the host computing device 10. The video port of the host computing device may be configured to directly receive a signal that is output by the data capture device 20, e.g., DBP signal 56. Thus, there may be no reason to process the signal in the ASIC 50 before it is forwarded to the host computing device 10. As will be described below, when the data capture device 20 and host computing device 10 are configured, there may be signals which are passed between the devices which allow for the proper configuration of the ASIC 50. One of these configuration parameters may be that the video port of the host computing device is configured to accept the original output of the data capture device 20. Thus, the ASIC 50 will be configured to directly forward the signal to the video port without further signal processing.

However, such direct forwarding of the signal does not eliminate the use of the ASIC 50 for an embodiment where the data capture device 20 signal is acceptable, as is, for the video port of the host computing device 10. As described above, during initialization of the data capture device 20 and the host computing device 10, the ASIC 50 will play a role in determining configuration parameters for the devices 10 and 20, including software deployment. This process will be described in greater detail below.

In addition, as described above, the purpose of the functionality of the ASIC 50 is to make the data capture device 20 compatible and easily configurable with a variety of host computing devices 10. Thus, because there may be one host computing device 10 that will accept the output signal of the data capture device 20, as is, this does not make the data capture device 20 compatible with a variety of host computing devices 10. The functionality associated with the ASIC 50 allows the data capture device 20 to be used in a plug and play fashion with a variety of host computing devices 10, including those which will not directly accept the output signal of the data capture device 20. Furthermore, it should be noted that when referring to the host computing device 10 not directly accepting the output signal, this is meant to refer to the fact that the host computing device cannot accept the signals in a plug and play manner. For example, the host computing device 10 may accept an analog input signal from the data capture device 20, but extensive configuration of both devices is required to allow operation. The ASIC 50 allows such a data capture device 20 to be configured in a plug and play manner to the host computing device 10.

Continuing with the final exemplary input signal from the data capture device 20, the grey scale pixel signal 58. The signal 58 is input into the ASIC 50 and forwarded to the multiplexer 64 which converts the signal into the same 10-bit digital data signal as described above. The signal is then forwarded to the video port of the host computing device 10 for further processing.

Along with the 10-bit digital data signal, the ASIC 50 will also pass through the appropriate control signals 68. Examples of the control signals 68 include line sync signals, pixel clock signals, frame sync signals, start of scan signals, etc. Those of skill in the art will understand that various control signals 68 need to be passed to the host computing device 10 in order for the proper processing of the data capture device 20 signal.

As shown in FIG. 2, the communication between the ASIC 50 and the host computing device 10 is a two-way communication. The interface for this two-way communication is the I2C (Inter-IC) bus 70 which is a bi-directional two-wire serial bus that provides a communication link between integrated circuits, e.g., the ASIC 50 and the microprocessor of the host computing device 10. Some examples of this bi-directional communication will be described in greater detail below. The ASIC 50 also includes read/write registers 72. The registers 72 may be used to record information such as configuration information. An example of using the registers 72 is provided below.

Figure 3:
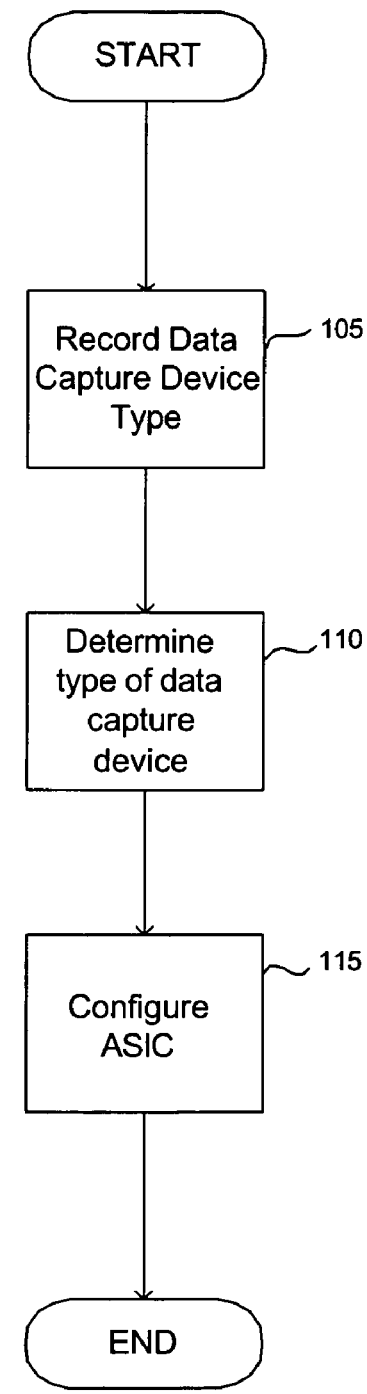
FIG. 3 shows an exemplary process for configuring a device which includes a data capture device with an ASIC and a host computing device according to the present invention.

FIG. 3 shows an exemplary process 100 for configuring a device 1 which includes a data capture device 20 with an ASIC 50 and a host computing device 10. This configuration may take place, for example, at the factory when the data capture device 20 is integrated with the host computing device 10, when the device 1 is initially booted up, etc. In step 105, the type of data capture device 20 (e.g., laser, RFID reader, camera, etc.) into which the ASIC 50 is installed is recorded in the register 72. Those of skill in the art will understand that this type information may be stored in the register 72 by coding the ASIC 50 before installation in the data capture device 20, by embedded software in ASIC 50 which polls the data capture device 20 to determine its type, by embedded software in the data capture device which registers the data capture device 20 with the ASIC 50, etc.

The host computing device 10 may then read the register 72 of the ASIC 50 to determine the type of data capture device 20 (step 110). The host computing device 10 may have installed software to facilitate the reading of the registers 72. As described above, the actual communication between the host computing device 10 and the ASIC 50 takes place using the I2C bus 70 as shown in FIG. 2.

The process then continues to step 115 where the ASIC 50 is configured in order to provide the proper signal processing for the incoming signals from the data capture device 20. The software which resides on the host computing device 10 may be responsible for this configuration. After the software on the host computing device 10 has polled the registers 72 to determine the type of data capture device 20 to which the host computing device 10 is connected, the software may then send configuration information to the ASIC 50. As shown in FIG. 2, the host computing device 10 may communicate through the I2C bus 70 with various components of the ASIC 50. The software on the host computing device 10 may use this communication path to configure the various components of the ASIC 50 to operate properly for the type of data capture device.

For example, if the data capture device 20 is a type which sends differentiated analog signals 54, the software may configure the multiplexer 60 to handle this type of signal. Another example previously described above, is where the software configures the ASIC 50 to forward the signals from the data capture device 20, as is, to the host computing device 10. In a further example, the software may send configuration information to the multiplexer 64 to configure that component based on the type of signal it will receive based on the type of data capture device 20.

Those of skill in the art will understand that the above were only examples and that the software may also configure other components of the ASIC 50. For example, the software may set other read/write registers 72 of the ASIC 50 which causes further configuration information to be set up for the ASIC 50. An example may be that the ASIC 50 includes various embedded software applications. One or more of these applications may be activated (or configured) based on the type of data capture device. Furthermore, the software may never directly communicate with some of the configurable components on the ASIC 50, e.g., all configuration may be performed internally by the ASIC 50 based on the register 72 settings which are set by the software.

In the above exemplary embodiment, the configuration information was determined by software on the host computing device 10 based on the type of data capture device 20. Thus, the software on the host computing device 10 will contain configuration settings for a variety of data capture devices 20. A software application may be written and loaded onto the host computing device 10 which includes various configuration information for a number of data capture devices 20, e.g., configuration settings for each type of data capture device 20 may be stored in database. When the host computing device 10 is connected to the data capture device 20, the software may be activated to determine the type of data capture device 20, as described above with reference to step 110. Once this determination is made, the software may access the proper configuration settings for the data capture device 20 and then configure the ASIC 50.

In addition, the configuration of the ASIC 50 may be based on more information than just the type of data capture device 20. For example, the host computing device 10 may include a variety of applications. For example, a first host computing device 10 may include an application which only receives one type of data. Whereas, a second host computing device 10 may include multiple applications which are capable of receiving different types of data and perform different operations on these different types of data. A particular data capture device 20 may be capable of outputting all the different types of data to satisfy the first and second host computing device 10. However, the ASIC 50 may be configured differently based on whether the first or second host computing device 10 is going to receive the data. Thus, the type of information that the host computing device 10 desires to receive may be based, in part, on the applications which are loaded on the host computing device 10. Therefore, the configuration information which the software sends to the ASIC 50 may depend not only on the configuration settings for the type of data capture device 20, but also on other information.

Another example of other information which may be relevant to the configuration of the ASIC 50 is the type of processor in the host computing device 10. For example, if the host computing device includes a high MIPS (million instructions per second) processor such as the MX-1 processor and the data capture device 20 is a laser, the software may configure the ASIC 50 to use an input analog signal 52 or a differentiated analog signal 54, instead of the DBP signal 56 because of better performance. Other configuration parameters that may be set (e.g., by setting registers 72) based on this collected information (e.g., type of data capture device 20 and type of processor) may include the use of various processing algorithms in order to increase the performance of the mobile computing device 1.

Upon completion of the configuration step 115, the ASIC 50 is configured for operation with the specific data capture device 20 and host computing device 10. As can be seen from the above exemplary embodiment, the inclusion of the ASIC 50 with the data capture device 20 and the configuration software on the host computing device 10 allows data capture devices 20 to operate in a plug and play manner with different host computing devices 10. Thus, a variety of data capture devices 20 can be plugged into any host computing device 10. Similarly, a particular data capture device 20 can be plugged into a variety of host computing devices 10.

This plug and play feature allows the separation of front end scanning (or data capture) development from back end decoding of data. A new data capture device 20 can be simply plugged into an existing host computing device 10. Likewise, new decoders or data applications can be added to host computing devices 10 and currently attached data capture devices may be easily re-configured (using the ASIC 50) to support the new applications.

In an alternative embodiment, it may be considered that the software described as residing on the host computing device 10 may reside on the ASIC 50, e.g., as embedded software. In such an embodiment, the ASIC 50 may poll both the data capture device 20 and the host computing device 10 to determine the various information for both devices 10 and 20. The software may include the various configuration settings described above and, thus, the ASIC 50 may configure itself internally, using the information it received from the host computing device 10 and the data capture device 20.

In the above exemplary embodiments, it was described that the output of the ASIC 50 will be forwarded to the video port of the processor of the host computing device 10. However, the ASIC 50 may also be configured to send other types of signals which may be received by another port or input of the processor. Moreover, the ASIC 50 was described as residing with (or installed in) the data capture device 20. However, there is no requirement that the ASIC 50 be installed as an integral component of the data capture device 20. The ASIC 50 may be installed in the host computing device 10 or it may be a stand alone device that is merely integrated into the mobile computing device 1 when the data capture device 20 and host computing device 10 are integrated.

Finally, the exemplary embodiment is described as a mobile computing device. However, there is no requirement that the final device be a mobile device. For example, there may be a data capture device 20/host computing device 10 combination that is fixed at a particular location, e.g., an RFID reader with host computing device which is located at an entrance/exit of a building, at a cash register, at a checkpoint, etc. Thus, the combination is not required to be mobile.

The present invention has been described with the reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A system, comprising:
   a host computing device;
   a data capture device collecting data signals; and
   an intermediate signal processing device connected to the data capture device and including an indication of a type of the data capture device, the data capture device and the intermediate signal processing device being connected to the host computing device, the host computing device receiving an initial communication indicating the type of the data capture device, the intermediate signal processing device receiving configuration data from the host computing device and the intermediate signal processing device being configured to facilitate communications between the data capture device and the host computing device, the configuration governing all communications through the intermediate signal processing device until such time as a different type of data capture device is connected thereto, the intermediate signal processing device receiving the data signals from the data capture device, processing the data signals and forwarding the processed data signals to the host computing device.

2. The system of claim 1, wherein the data capture device is one of a laser, an imager, an RFID reader and a bar code scanner.

3. The system of claim 1, wherein the configuration data includes one of a type of processor in the host computing device and a software application included in the host computing device.

4. The system of claim 1, wherein the intermediate signal processing device is an ASIC.

5. The system of claim 1, wherein the data signals are one of analog signals, differentiated analog signals, DBP signals and grey scale pixel signals.

6. The system of claim 1, wherein the processed data signals are 10-bit parallel digital signals.

7. The system of claim 1, wherein the processed data signals are forwarded to a video port of a processor of the host computing device.

8. A method, comprising the steps of:
   recording a type of a data capture device in an intermediate signal processing device, wherein an output of the data capture device is coupled to an input of the intermediate signal processing device;
   polling the intermediate signal processing device to determine the type of the data capture device; and
   configuring the intermediate signal processing device based on the type of data capture device, the configuration governing all communications through the intermediate signal processing device until such time as a different type of data capture device is connected thereto, wherein an output of the intermediate signal processing device is coupled to an input of a host computing device.

9. The method of claim 8, further comprising the steps of:
   collecting a data signal with the data capture device;
   forwarding the data signal to the intermediate signal processing device;
   processing the data signal based on the configuration of the intermediate signal processing device; and
   forwarding the processed data signal to the host device.

10. The method of claim 8, further comprising the steps of:
    polling the host computing device to determine host information; and
    further configuring the intermediate signal processing device based on the host information.

11. The method of claim 8, wherein the type of the data capture device is recorded in a register of the intermediate signal processing device.

12. The method of claim 8, further comprising the step of:
    forwarding a control signal from the data capture device to the host computing device via the intermediate signal processing device.

13. A system, comprising:
    a configurable intermediate signal processing device connected to a data capture device and including an indication of a type of the data capture device
    a configuration element receiving an initial communication from the intermediate signal processing device indicating the type of the data capture device and sending configuration data to the intermediate signal processing device to configure the intermediate signal processing device to facilitate communications between the data capture device and a host computing device, the configuration governing all communications through the intermediate signal processing device until such time as a different type of data capture device is connected to the intermediate signal processing device.

14. The system of claim 13, wherein the configuration element is a software application residing on the host computing device.

15. The system of claim 13, wherein the configurable intermediate processing device is an ASIC.

* * * * *